United States Patent
Yoshioka et al.

[11] Patent Number: 6,035,053
[45] Date of Patent: Mar. 7, 2000

[54] MOVING SUBJECT RECOGNIZING SYSTEM FOR AUTOMOTIVE VEHICLE

[75] Inventors: Tohru Yoshioka, Hiroshima; Tomohiko Adachi, Higashihiroshima, both of Japan

[73] Assignee: Mazda Motor Corporation, Hiroshima-ken, Japan

[21] Appl. No.: 08/940,639

[22] Filed: Sep. 30, 1997

[30] Foreign Application Priority Data

Sep. 30, 1996 [JP] Japan .................................. 8-258544

[51] Int. Cl.$^7$ ...................................................... G06K 9/00
[52] U.S. Cl. .................. 382/104; 382/103; 382/106; 382/107; 382/291; 340/435; 340/903; 340/906; 348/143; 348/149; 348/152; 348/169; 348/171; 701/96; 701/300; 701/301
[58] Field of Search ................................. 328/103, 104, 328/105, 106, 107, 108, 291; 340/435, 436, 437, 903, 904, 906, 907; 348/113, 142, 143, 148, 149, 151, 152, 169, 170, 171, 172; 701/96, 300, 301

[56] References Cited

U.S. PATENT DOCUMENTS

| | | | |
|---|---|---|---|
| 4,257,703 | 3/1981 | Goodrich | 356/4.03 |
| 5,396,426 | 3/1995 | Hibino et al. | 701/96 |
| 5,530,771 | 6/1996 | Maekawa | 382/103 |
| 5,754,099 | 5/1998 | Nishimura et al. | 430/435 |
| 5,815,825 | 9/1998 | Tachibana et al. | 701/23 |
| 5,818,355 | 10/1998 | Shirai et al. | 340/903 |

FOREIGN PATENT DOCUMENTS

| | | |
|---|---|---|
| 5-54297 | 3/1993 | Japan . |
| 8-313632 | 11/1996 | Japan . |

Primary Examiner—Christopher S. Kelley
Assistant Examiner—Sheela Chawan
Attorney, Agent, or Firm—Sidley & Austin; Hugh A. Abrams

[57] ABSTRACT

A moving subject recognizing system for recognizing a subject, such as a pedestrian, moving toward a forward path of a vehicle to avoid a collision against the subject scans a field ahead the vehicle to detect a transverse velocity of a subject moving in a transverse direction and a longitudinal distance of the subject in a direction of the traveling path which are compared with a first and a second threshold value, respectively, and recognize that the subject is in danger of entering the traveling path and hit by the vehicle when the transverse velocity is greater than the first threshold value and the variation of the longitudinal distance is smaller than the second threshold value.

21 Claims, 14 Drawing Sheets

PEDESTRIAN

TIME (sec)

PEDESTRIAN

VARIATION (m)

DEFINITION OF DISTANCE VARIATION

MOVING SUBJECT RECOGNIZING SYSTEM FOR AUTOMOTIVE VEHICLE

BACKGROUND OF THE INVENTION

1. Field of the Invention

This invention relates to a moving subject recognition device for an automotive vehicle which is incorporated with an anticollision system.

2. Description of Related Art

In recent years, what is called an advanced safety vehicle provided with an anticollision system has been proposed. Some types of anticollision systems employ a combination of radar forward looking sensor and a brake. Such an anticollision system is known from, for example, Japanese Unexamined Patent Publication No.5-54297.

Typically, anticollision systems or collision avoiding systems detect moving vehicles, stationary subjects such as roadway structures ahead in the traveling path of the vehicle and provide an warning or automatically apply brakes when detects that there is a danger of causing a collision between the vehicle and subjects.

It has been obtained from many statistic analysis of traffic accidents or collisions that persons, who were involved in fatal car accidents are on foot, in particular during crossing a roadway, in many cases. Accordingly, avoiding involvement in a collision against a pedestrian crossing the roadway by use of such an anticollision system is contributory to a significant reduction in the fatality rate of a vehicle. The conventional anticollision system can recognize a pedestrian in the roadway as a moving subject which is in the danger of being hit by the vehicle and try to avoid a collision against the pedestrian. Since, as watched from the vehicle, it can be said that a pedestrian who is going to across a traveling path ahead the vehicle rushes out into the roadway, it is thought that there are many cases where, even if the anticollision system detects the pedestrian as a subject in danger of being possibly hit by the vehicle immediately after he or she rushes out into the roadway, it is already too late for the anticollision system to avoid a collision.

On a foot passenger who is presently out of a traveling path ahead the vehicle and, however, is possibly expected to cross the traveling path before long, it is necessary for the vehicle to recognize the passenger as a subject in danger of being hit by the vehicle even before the passenger appears into a traveling path ahead the vehicle. Most of pedestrians reflect radar beams less than vehicles and roadway structures. When increasing the response sensitivity of the radar in order to detect such a pedestrian, it is hard for the radar to extract beams reflected by the pedestrian only due to an increased disturbance caused by the surroundings. In particular, roadway structures, such as guardrail or crash barriers show reflection patterns similar to those of persons on foot and, accordingly, are hardly distinguishable from those persons. In other words, guardrails arranged at appropriate separations along the roadway are recognized just like fragmentary bodies in subject recognizing process as watched from the vehicle. Especially, when the guardrails are at close distances to the vehicle, there is considerable chance of grasping the guardrails like moving subjects having apparent lateral velocities including a lower recognition target threshold of 0.6 m/sec. for pedestrians due to the measuring accuracy of a laser radar.

If the anticollision system always reacts on every pedestrian out of the roadway, it is caused too frequently to travel. For this reason, the anticollision is needed to react only on pedestrians who cross the roadway ahead of the vehicle and are possibly expected to be involved in a collision. As a result, there is a strong demand for an algorithm for precise detection of pedestrians who are crossing the roadway exposing themselves to the danger of being possibly hit by the vehicle.

SUMMARY OF THE INVENTION

It is accordingly of the invention to provide a moving object recognizing system for distinguishing between moving subjects and stationary subjects along a roadside such as guardrails and reliably recognizing a moving subject with a high possibility of entering the roadway ahead the vehicle equipped with the recognizing system.

The foregoing object of the invention is accomplished by providing a moving subject recognizing system for recognizing a subject moving toward a forward path of a vehicle equipped with the recognizing system to avoid a danger of possibly hitting a moving subject. The recognizing system comprises a scanning means, such as a laser radar, for scanning a forward field including a path in which the vehicle travels to acquire data of attributions of moving subjects in the forward field based on scanning echoes, and a recognizing means for detecting a transverse velocity of a subject moving in a direction transverse to the traveling path of the vehicle and a longitudinal distance of the moving subject in a direction of the traveling path based on the echo data which are compared with a first and a second threshold value, respectively, and recognizing that there is a danger that the moving subject enters the path when the transverse velocity is greater than the first threshold value and the variation of said longitudinal distance is smaller than the second threshold value.

The recognizing system of the invention is adapted to recognize stationary subjects based on a variation of longitudinal distance of the subject does not misidentify stationary subjects, such as guardrails along a roadside which are seemingly observed likely to have apparent lateral velocities and apt to be recognized as pedestrians moving in a direction transversely to the traveling path, as moving pedestrians.

Because only objects close to the vehicle are seemingly observed likely to have apparent lateral velocities, hazard subject recognition may be executed restrictively for subjects in an area closer to the vehicle, and the first threshold value for subject at closer distances may be increased in order to reduce the probability of misidentifying such a stationary subject at a close distance as a moving subject.

When a moving subject remains recognized as having a danger of entering the traveling path for more than a specified period of time, the system continues to recognize the moving subject as still having a danger of entering the traveling path even after the transverse velocity of the moving subject becomes lower than the first threshold value. Accordingly, such a moving subject is continuously monitored as a hazardous subject.

Measuring a transverse velocity of a moving subject in a direction perpendicular to the traveling path makes it easy to recognize a hazardous subject.

The recognizing system may extract a moving subject having a possible danger of being hit by the vehicle if continuing to move toward the traveling path based on the transverse velocity. Further, it may detect an inter-distance between a moving subject and the vehicle to extract a moving subject having a possible danger of being hit by the vehicle based further on a change in the inter-distance. This guarantees security against traffic accidents. Hazardous subjects may be limited to those in a transverse area which is defined between the traveling path and one of side lines of lanes on opposite sides of the vehicle which is distant from the traveling path more than the other with an effect of excluding subjects out of the roadway.

The recognition system may send out a warning to the driver of the vehicle when detecting an inter-distance less than a predetermined warning distance and/or automatically control a driving system, such as a braking system, steering system, or the like, to certainly avoid a collision against the moving subject when detecting an inter-distance less than a predetermined imminent distance.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
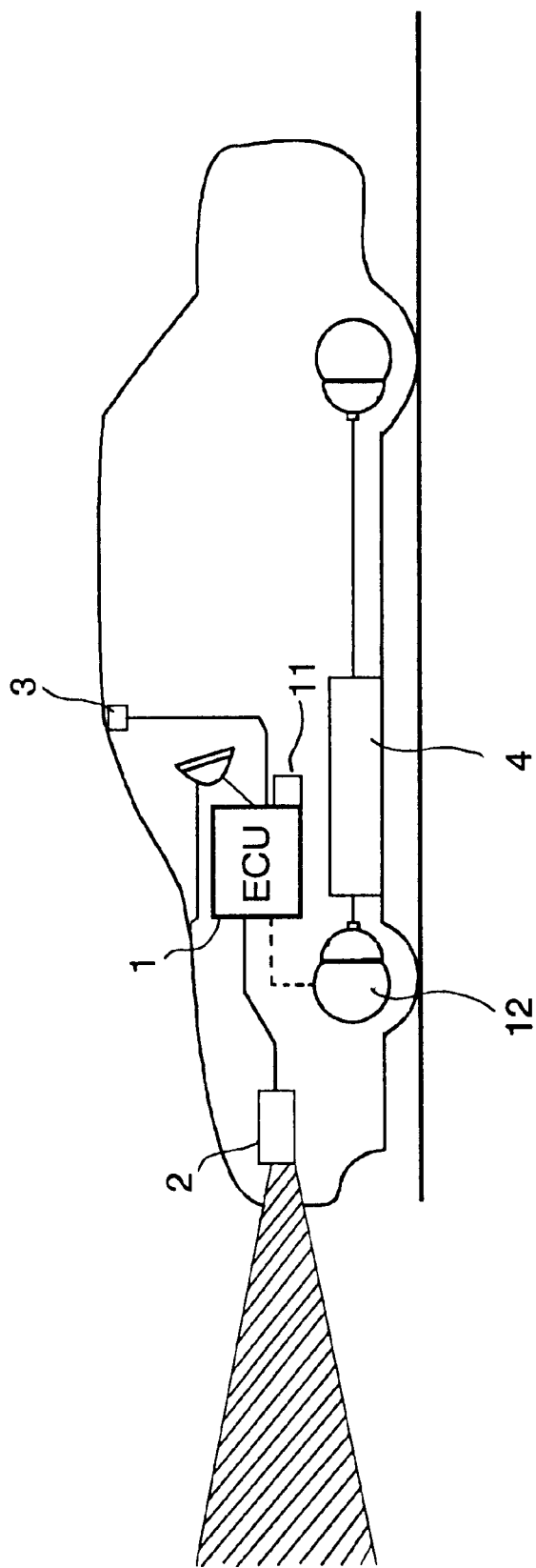
FIG. 1 is a schematic illustration of a vehicle equipped with a moving subject recognizing system of the invention.
Figure 2:
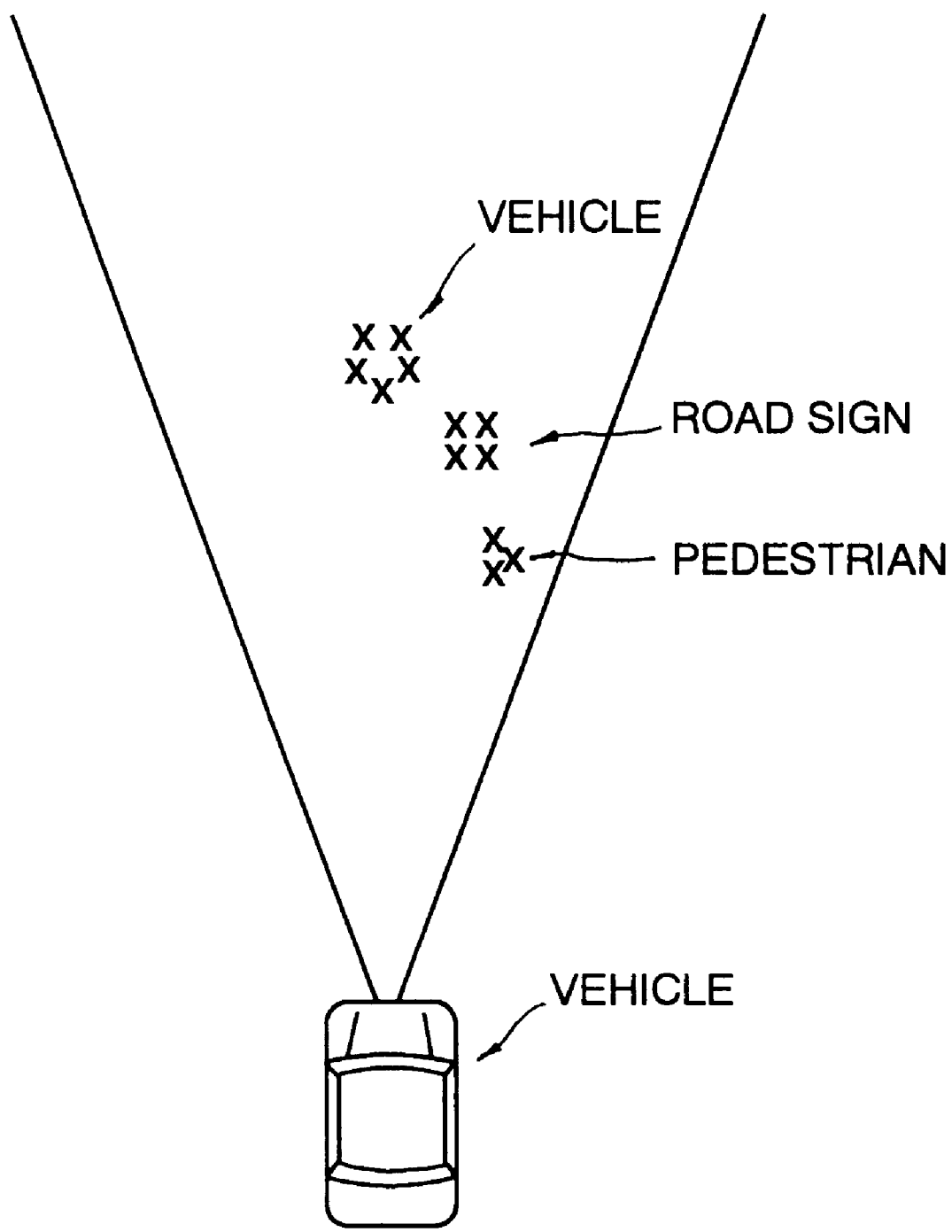
FIG. 2 is an illustration showing scanning by a laser radar incorporated in the moving subject recognizing system shown in FIG. 1.

Referring to the drawings in detail, particularly to FIGS. 1 and 2 which shows an automotive vehicle equipped with an moving subject recognizing system according to an embodiment of the invention, the moving subject recognizing system includes a laser radar 2 attached to a front portion of the vehicle, an CCD type of electronic video camera 3 attached to a ceiling of the vehicle which monitors a scene ahead the vehicle and an electronic control unit (ECU) 1 which is connected to the laser radar 2 and the CCD camera 3 and automatically controls a brake system. As shown in FIG. 2, the laser radar 2 periodically scans a region of a traveling path ahead the vehicle and receives echo from subjects in the scanning area. Echo includes data of an inter-distance $L_i$, an angle of reflection $\theta_i$ and a strength of reflection K. The laser radar 2 acquires echo data of approximately 500 points (i=1 to 500) every scan. The control unit 1 receives data of variables of driving conditions of the vehicle (which are hereafter referred to as driving state variables). The data of driving state variables includes a vehicle velocity $v_0$, a yaw rate $\psi$ and an angle of steering $\theta_H$ which are detected by sensors well known to those skilled in the art. The control unit 1 performs image processing of a video image provided by the CCD video camera 3 and generates data of variables of road conditions (which are hereafter referred to as road condition variables) including a curvature of a roadway R, the width of opposite traffic lane, or the left half width of the roadway $d_L$, and the width of ongoing traffic lane, or the right half width of the roadway $d_R$ based on the processed image data. These data are basically obtained by curve-fitting to a median strip of the ongoing lane of the vehicle. The vehicle is equipped with a warning unit 11 providing, for example, an alarm sound and an automatic brake actuator 12 for automatically applying brakes, which are controlled by the control unit 1.

This moving subject recognizing system performs recognition of a moving subject ahead the vehicle.

Figure 3:
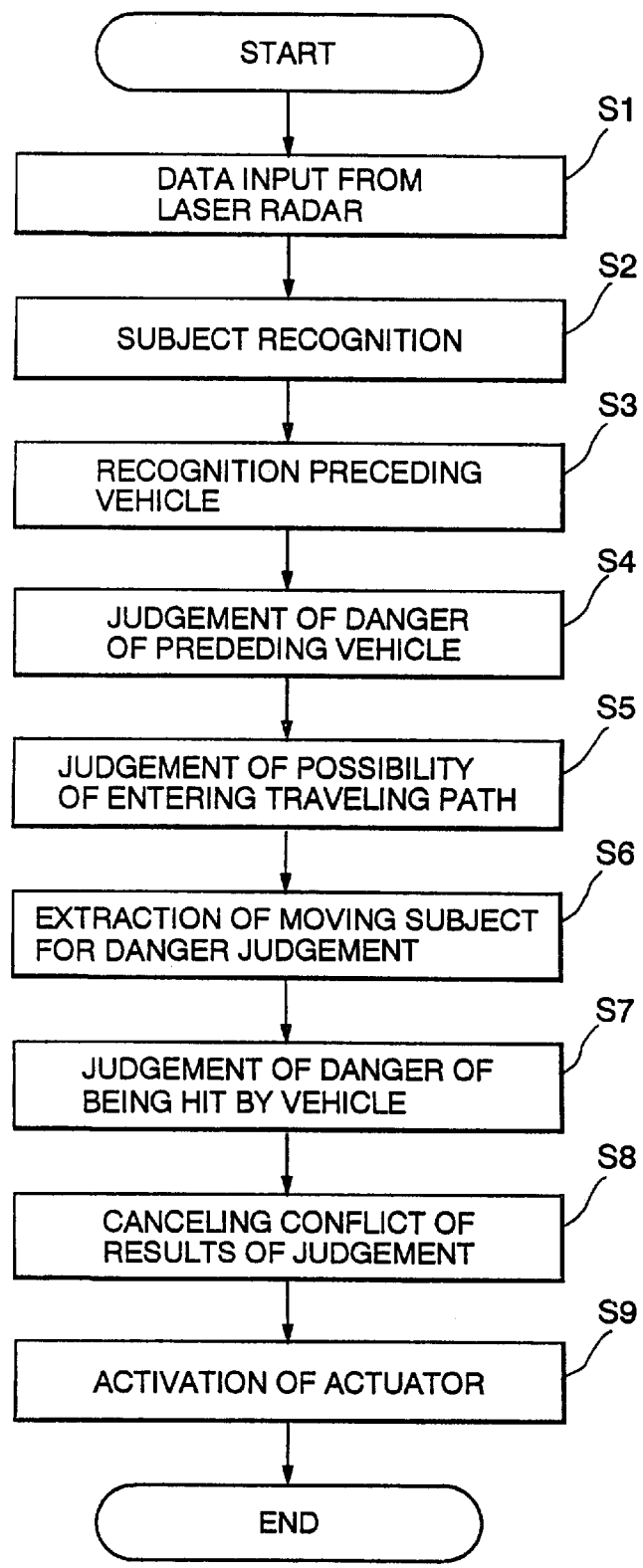
FIG. 3 is a flow chart illustrating the general sequence routine of moving subject recognition with the moving subject recognizing system according to an embodiment of the invention.

Referring to FIG. 3 showing a flow chart of a general sequential routine of recognition of moving subjects ahead the vehicle in which the flow chart logic is executed once every scan of the forward scene by the CCD camera 3, when the flow chart logic commences and control passes directly to a function block at step S1 where the control unit 1 acquires various data including at least echo data $L_i$, $\theta_i$ from the laser radar 2, data of driving state variables $v_0$, $\psi$, $\theta_H$ of the vehicle, and data of road condition variables R, $d_L$, $d_R$ of the ongoing roadway. Subsequently, a process of subject recognition is executed at step S2. The subject recognition is achieved by integrating echo data from the laser radar 2 by subject, separating subjects picked up by the laser radar 2 by subject type, such as vehicles, pedestrians, guardrails, traffic signs, reflectors and so forth, and processing the data to provide information for each type of subject. An end result in the subject recognition process provides information on the following attributes of the recognized subject:

N: the number of subject;

$L_N$: the inter-distance between the vehicle and the subject;

$\theta_N$: the angle of subject with respect to the direction of travel of the vehicle;

$V_{LONG.N}$: the longitudinal velocity of subject;

$V_{LAT.N}$: the lateral velocity of subject;

$D_{LONG.N}$: the variation in longitudinal distance;

$D_{LAT.N}$: the variation in lateral distance; and

Num.N: the number of sampled subjects or the elapsed time from starting sampling. where a subscript N in the parameter indicates the subject number N assigned to. There is another information whether the recognition of subject is being continued.

The term "longitudinal velocity $V_{LONG}$." as used herein shall mean and refer to the velocity of a subject in the direction in parallel to the traffic lane on which the vehicle is traveling, and the term "lateral velocity $V_{LAT}$. as used herein shall mean and refer to the velocity of a subject in the direction transverse to the traffic lane on which the vehicle is traveling. The lateral velocity $V_{LAT}$. is measured as positive in the direction in which a subject heads for the lane on which the vehicle is traveling. Further, the term "longitudinal distance variation" as used herein shall mean and refer to the difference between the longest and the shortest longitudinal distance of a specific extent which is recognized as a subject as a result of the subject recognition process based on echo data, and the term "lateral distance variation" as used herein shall mean and refer to the difference between the largest and the smallest transverse width of the specific extent.

Thereafter, processes are executed at steps S3 and S4 to recognize a moving subject and judge the degree of danger against the vehicle, respectively. Specifically, at step S3, a subject which is estimated based on image data and a driving state to be the most likely subject on the lane on which the vehicle is traveling is distinguished as a preceding vehicle or an obstacle from other subjects. In the judgement of the danger degree of the subject against the vehicle, based on the relative driving relationship between the vehicle and the preceding vehicle or the obstacle, such as the vehicle is following the preceding vehicle, whether the preceding vehicle is during a rapid deceleration, and/or whether the preceding vehicle or obstacle stops, the control unit 1 determines whether to send out a warning or to apply brakes by the utilization of an algorithm for judging the danger degree of the subject to the vehicle. Since these processes are not direct importance to the invention and can easily be arrived at by those skilled in the art, the process will not be set out in detail.

When a subject is recognized and the degree of danger of the subject to the vehicle is found, processes are executed through steps S5 to S8 to judge the degree of danger of the subject to the vehicle if the subject is moving laterally to the roadway. Hereafter, the term "moving" subject or subject is used to mean and refer to a subject, in particular a pedestrian, which seems to likely cross the roadway in a direction perpendicular to the traveling path of the vehicle which is generally in parallel to the roadway. The process of judging the degree of danger of a crossing subject to the vehicle is performed in order to recognize a moving subject, such as a pedestrian in many case, which likely crosses the lane on which the vehicle is traveling beforehand and prevent the anticollision system from missing a chance to avoid a collision against the moving subject. This process is achieved by judging the degree of possibility that the moving subject enters the traveling lane of the vehicle based on the lateral velocity $V_{LAT.N}$ of the moving subject acquired at step S2, and determining that the moving subject is in danger of being hit by the vehicle when the possibility of entry of the moving subject is significant. Specifically, the danger degree judging process comprises the steps of judging the degree of the possibility of entry of a moving subject made at step S5, extracting a subject in danger being hit by the vehicle with a high probability by the vehicle at step S6, determining that the moving subject in danger of being hit at step S7, and canceling conflict with the result of the determination of the danger as to a preceding vehicle at step S8. Finally, the anticollision system is effected to send out a warning or to apply brakes at step S9 if necessary.

Figure 4:
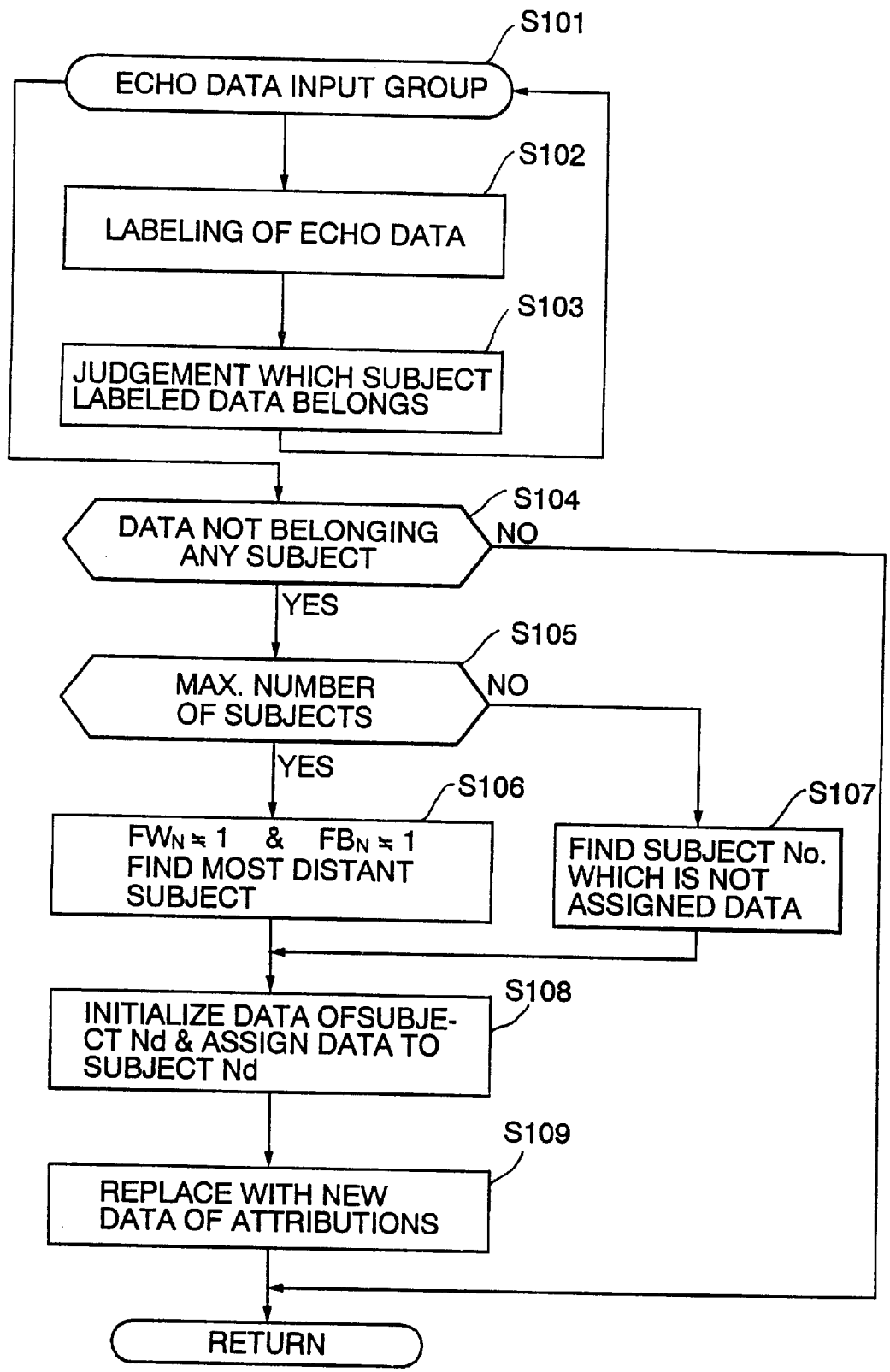
FIG. 4 is a flow chart illustrating the sequence routine of moving subject recognition in detail.

FIG. 4 is a flow chart illustrating the sequence routine of the subject recognition process executed at step S2. This flow chart illustrates the flow chart logic to find which one of subjects included in laser radar echoes is to be left as a subject and, however, omits the flow chart logic to acquire attributes of a subject is omitted. Processing all data of subjects contained in the laser radar echoes imposes a burden too large on the control unit 1, and consequently, there is a strong demand for extraction of data of a limited number of subjects which have higher risks of collision and cancellation of data of subjects which are less hazardous. For this purpose, the conventional anticollision system, which is adapted to cancel data of subjects closer to the vehicle but out of the traveling lane of the vehicle, disregards data of any hazardous pedestrian moving on the roadway with a high degree of possibility to enter the traveling lane of the vehicle and is impossible to avoid a collision against such a pedestrian consequently.

In view of the above drawback of the conventional anticollision system, the moving subject recognizing system of the invention is adapted to cancel data of subjects at the longest distance from the vehicle based on the understanding that data of subjects closer to the vehicle should be taken seriously. The subject at the longest distance is difficult to be detected with a high accuracy by the laser radar 2 when considering yawing of the vehicle and is recognized as a closer subject and took into consideration as it is approached by the vehicle, and, therefore, it is insignificant to cancel data of the subject at the longest distance having been judged to be hazardous once is treated as an exception and is not disregarded.

Referring to FIG. 4, after acquired data of sampled points included in the laser radar echoes at step S101, each data is labeled at step S102. At step S103, it is judged which subject the labeled data belongs. These steps S101 to S103 are repeated until the data of the entire points (i) sampled during a scan are grouped by subject. A determination is subsequently made at step S104 as to whether data of a sampled point of a subject included in latest laser radar echoes acquired at step S101 is not of any one of subjects having been recognized. If in fact there is data of such a new subject, another determination is made at step S105 as to whether a specified limit number of recognized subjects, which is set forth according to the processing capacity of the system is reached. When the limit number of subjects is not reached, a subject number Nd which has not been assigned to any subject is searched at step S107. On the other hand, when the limit number of subjects is reached, while a warning flag FWN and a brake flag FWN are set down, and a subject number Nd which has been assigned to a subject at the longest distance is searched at step S106. In this instance, the state where both flag FWN and flag FWN are set down indicates that the subject having the subject number Nd has never recognized as a subject ahead the vehicle. After finding the subject number Nd at step S106 or S107, attribution data of the subject number Nd are initialized and then a subject of the subject number Nd is assigned to the subject of which data included in the latest laser radar echoes at step S108. Finally, previous attribution data are replaced with the attribution data belonging to the subject to which the subject number Nd is assigned at step S109. In this instance, the state where the flags FWN and flag FWN set down indicates that the subject in question has never recognized as a subject for the danger degree judgement.

Figure 5:
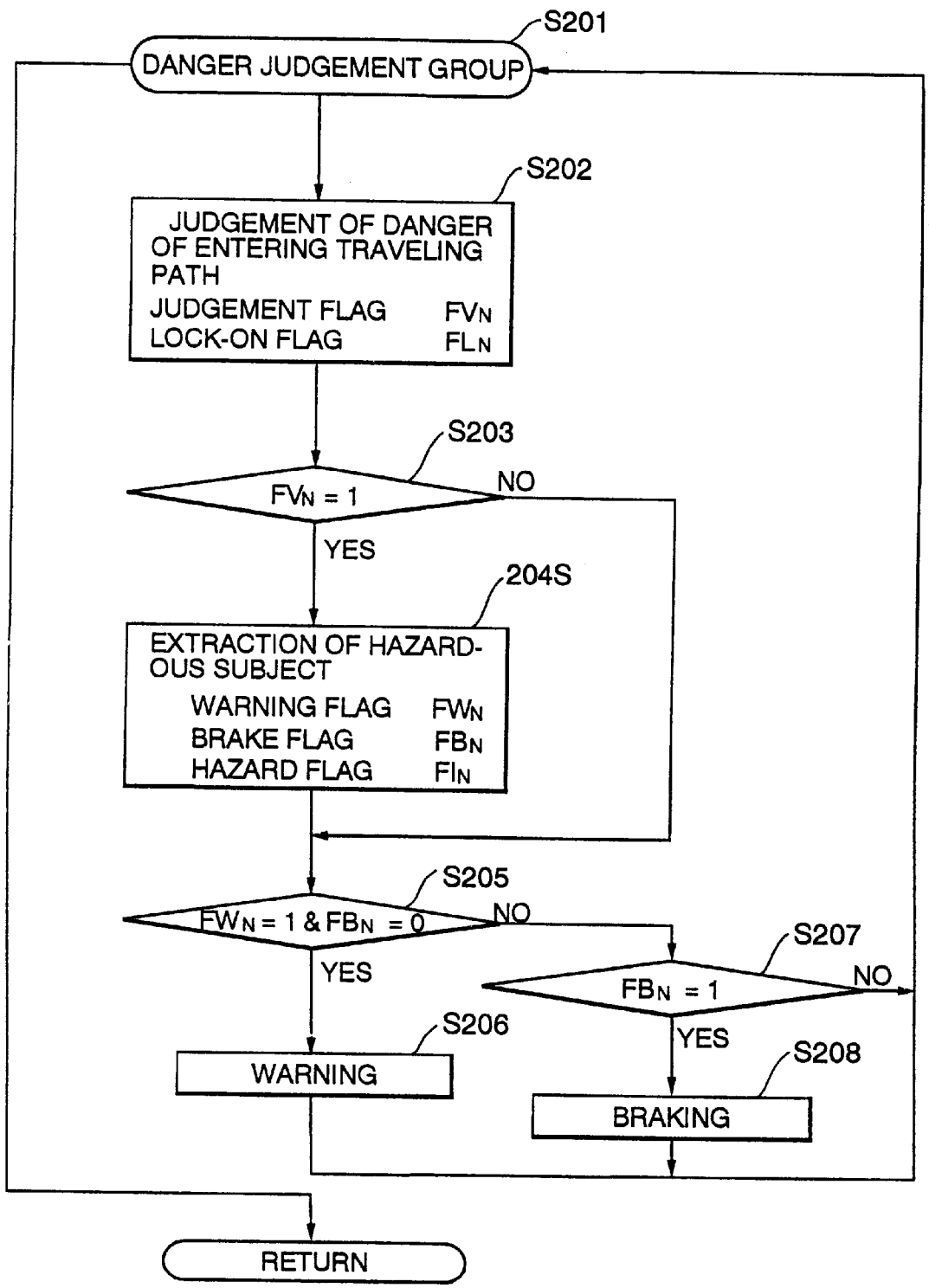
FIG. 5 is a flow chart illustrating the sequence routine of judging a hazard subject moving toward the traveling path of the vehicle.

FIG. 5 is a flow chart schematically illustrating the sequence routine of the danger degree judgement executed for a moving subject through steps S5 to S7. This flow chart logic is repeated, starting from step S201, for all subjects to which subject numbers have been assigned. In the judgement of the degree of the possibility of entry of a moving subject at step S202, a judgement flagFVN and a pedestrian lock-on flag FLN are set up or down according to the result of judgement. The judgement flagFVN set up to "1" indicates that the moving subject of the subject numberd N has a high degree of possibility to enter the traveling lane of the vehicle, and the pedestrian lock-on flag FLN set up to "1" indicates that the moving subject of the subject number N having had a high degree of possibility to enter the traveling lane of the vehicle once should be continuously observed even if it stops.

Subsequently, when it is determined at step S203 that the judgement flagFVN is set up to "1," the extraction of a subject which is possibly hit by the vehicle if continues to cross the roadway is executed, and the warning flag FWN and a brake flag FBN are up or down according to the degree of danger at step S204. In the event where the judgement flagFVN is not set up to "1" or reset down, the extraction of a subject which is possibly hit by the vehicle is skipped. If it is found at step S205 that the warning flag FWN is set up to "1," and the brake flag FBN is, however, reset down to "0," while a warning is sent out at step S206, brakes are not applied. On the other hand, if both warning and brake flags FWN and FBN are set up to "1" at steps S206 and S207, then, brakes are applied at step S208.

Figure 6:
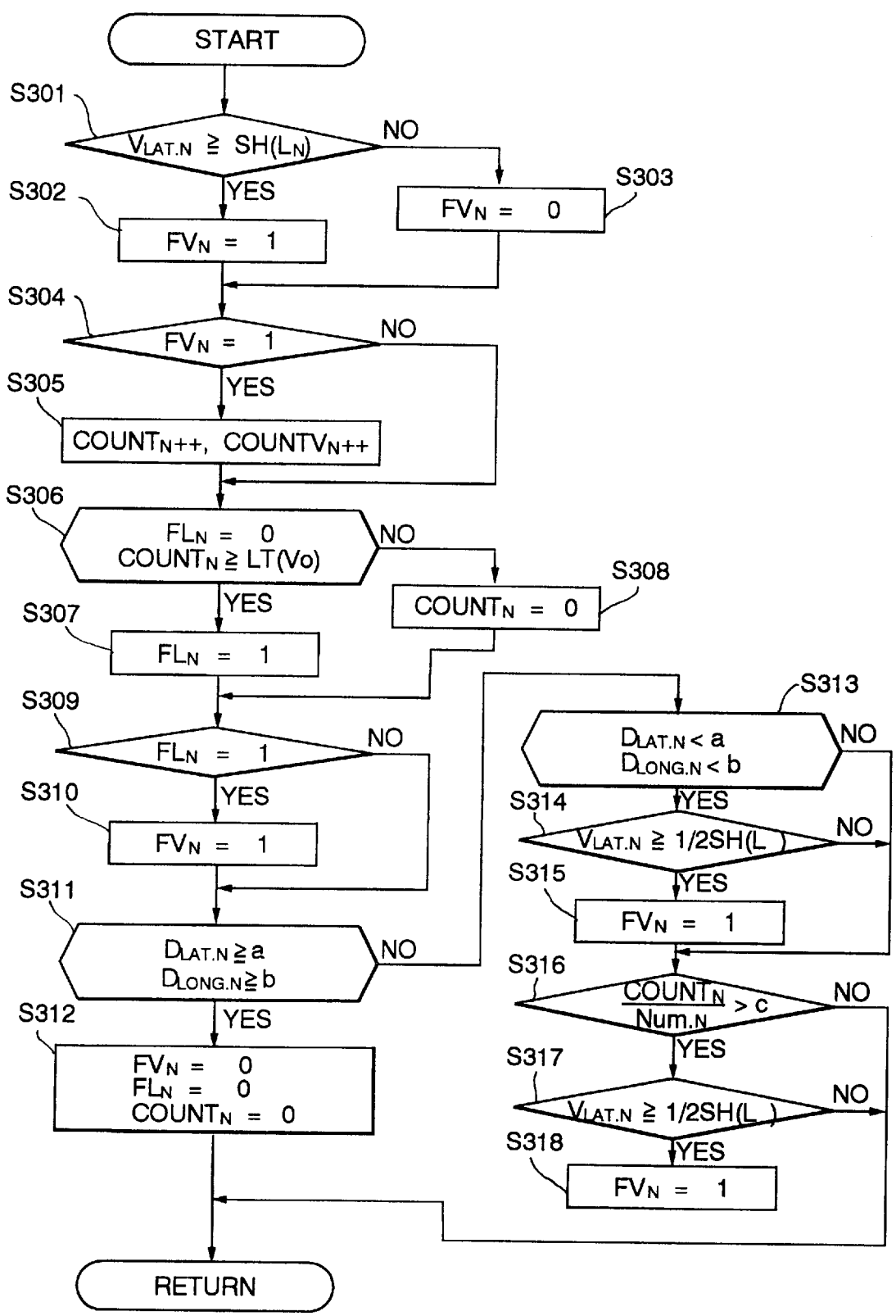
FIG. 6 is a flow chart illustrating the sequence routine of judging the degree of danger that a moving subject is possibly hit by the vehicle.

FIG. 6 shows a flow chart illustrating the sequence routine of the danger degree judgement executed at step S5 in the moving subject recognition sequence routine shown in FIG. 3 in detail. When the flow chart logic commences and control passes directly to a function block at step S301 where a determination is made as to whether a lateral velocity $V_{LAT.N}$ of the moving subject of the subject number N is higher than a judging threshold value $SH(L_N)$. When the lateral velocity $V_{LAT.N}$ is higher than the judging threshold value $SH(L_N)$, this indicates that the moving subject has a high degree of possibility to enter the traveling lane of the vehicle, then, the judgement flagFV$_N$ is set to "1" at step S302. On the other hand, the lateral velocity $V_{LAT.N}$ is lower than the judging threshold value $SH(L_N)$, the judgement flagFV$_N$ is reset to "0" at step S303.

Figure 7:
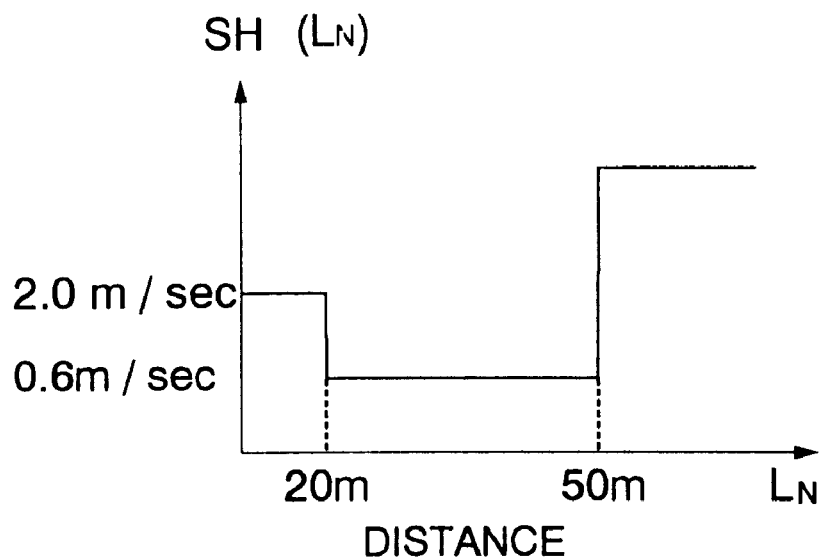
FIG. 7 is a graphical diagram showing a threshold value for judging the degree of danger.

As shown in FIG. 7, the threshold value $SH(L_N)$ is given by a function of inter-distance between the subject and the vehicle. Specifically, when the inter-distance $L_N$ is longer than 50 m, the threshold value $SH(L_N)$ is assigned the greatest value so as to reduce the probability of executing the judgement. When the inter-distance is moderate between 20 and 50 m, the threshold value $SH(L_N)$ is assigned the smallest value so as to increase the probability of executing the judgement. Further, when the inter-distance is shorter than 20 m, the threshold value $SH(L_N)$ is assigned a value slightly larger than when it is at middle distances. A pedestrian at a long distance from the vehicle is too slow as compared with the vehicle to be considered, so that the threshold value $SH(L_N)$ is set high for long distances. However, at close distances, the laser radar 2 is apt to misidentify a stationary subject, such as a guardrail, at a closer distance from the vehicle just as if it is crossing the roadway at an apparent lateral velocity $V_{LAT.N}$ with an increased possibility, which results from the low accuracy of measurement of the laser radar 2. If setting the threshold value $SH(L_N)$ to be low for close distances, it is hard to distinguish between stationary subjects and moving subjects having a lateral velocity $V_{LAT.N}$. For this reason, a somewhat high threshold value $SH(L_N)$ prevents the subject recognizing system from failing to distinguish between stationary subjects and moving subjects. However, in the event where when a pedestrian who has been recognized as a moving subject when crossing at a distance between 20 and 50 m from the vehicle is approached closer by the vehicle, the subject recognizing system may possibly fail to recognize the pedestrian as a moving one due to a high threshold value $SH(L_N)$ for close distances. In this point of view, in the case that a pedestrian is recognized continuously for a specified period of time, for example approximately 0.35 sec., as a moving one, the pedestrian lock-on processing is subsequently executed to retain the recognition that the pedestrian is crossing even at a speed lower than the threshold value $V_{LAT.N}$, which meets a moving pedestrian who stops for a while and resumes crossing the roadway. The specified time, namely a pedestrian lock on time, is embodied as a variable threshold value $LT(Vo)$ as shown in FIG. 8.

Figure 8:
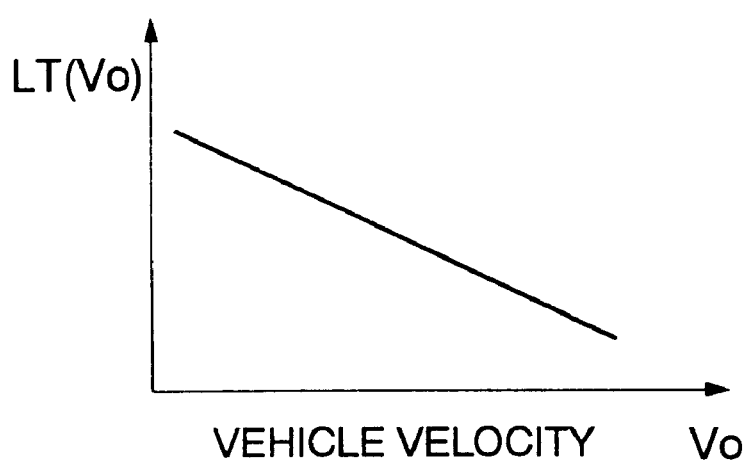
FIG. 8 is a graphical diagram showing a threshold value for locking a hazard moving subject.

Referring to FIG. 8 showing the relationship between lock-on threshold value $LT(Vo)$ and vehicle velocity Vo, the lock-on threshold value $LT(Vo)$ is given as an inverse proportion function of vehicle velocity Vo. The lock-on threshold value $LT(Vo)$ inversely proportional to the vehicle velocity Vo meets circumstances that it becomes harder to avoid hitting a moving pedestrian who enters the traveling path as the vehicle velocity Vo increases. Further, the lock-on threshold value $LT(Vo)$ makes the danger degree judgement for a moving subject successful to grasp a moving pedestrian at a long distance as long as the lateral velocity $V_{LAT.N}$ is large and to increase the chance to execute the lock-on processing for the pedestrian when the vehicle velocity Vo is high. Accordingly, a moving subject or pedestrian at a long distance from the vehicle who may be possibly hit by the vehicle traveling at a high velocity is continuously monitored with high probability.

Referring back to FIG. 6, After setting up or reset down the judgement flagFV$_N$, a determination is made at step S304 as to whether the judgement flagFV$_N$ is up. Subsequently, both lock-on counter and velocity variation counter are actuated to change their counts COUNT$_N$ and COUNTV$_N$ by an increment of one at step S305 when the judgement flagFV$_N$ is up. The lock-on counter is provided to count a time for which the lock-on processing is continuously executed for a moving subject having a subject number N which has been recognized as a hazardous one. The velocity variation counter is provided to evaluate the lateral velocity variation of a moving subject having a subject number N. The count COUNTV$_N$ of the velocity variation counter is changed by an increment of one when a specified threshold difference is exceeded by a difference between the latest lateral velocity $V_{LAT.N}$ and the previous one of a moving subject having a subject number N.

Subsequently, after changing the counts COUNT$_N$ and COUNTV$_N$ at step S305 when the judgement flagFV$_N$ is up, or without changing the counts COUNT$_N$ and COUNTV$_N$ when the judgement flagFV$_N$ is down, the lock-on count COUNT$_N$ is compared with a lock-on threshold value $LT(Vo)$ at step S306. When the lock-on count COUNT$_N$ exceeds the lock-on threshold value $LT(Vo)$, a lock-on flag FL$_N$ is set up to "1" at step S307. On the other hand, when the lock-on count COUNT$_N$ is less than the lock-on threshold value $LT(Vo)$ while the lock-on flag FL$_N$ has been down, then, the lock-on counter is reset to zero (0) with holding the lock-on flag FL$_N$ set down at step S308. When it is found that the lock-on flag FL$_N$ is up at step S309, the judgement flagFV$_N$ is set up to "1" at step S310. In the case that a moving pedestrian having a subject number N is locked once by setting up the judgement flag FV$_N$, the pedestrian is continuously monitored as a hazardous subject who enters the traveling path of the vehicle with a high degree of possibility even when it is judged that the pedestrian is immobile in the subsequent sequence routine. Although, in this instance, the lock-on flag FL$_N$ is set up when judgement flag FV$_N$ remains set up for a specified period of time, i.e. when the lock-on count COUNT$_N$ exceeds the threshold value $LT(Vo)$, it may be preferably set up immediately when the judgement flag FV$_N$ is up.

Thereafter, or without setting up the judgement flag FV$_N$ to "1" when it is found that the lock-on flag FL$_N$ is down at step S309, another determination is made concerning both longitudinal distance variation $D_{LONG.N}$ and lateral distance variation $D_{LAT.N}$ at step S311 in order to find whether the subject is guardrails, a group of pedestrians, a pedestrian with tottering steps, or other subjects. This determination is made based on a threshold value a for longitudinal distance variation for judgement of guardrails and a threshold value b for lateral distance variation for judgement of a group of pedestrians. In a subject recognition process, guardrails put at separations along the roadway look like fragmentary pieces as seen from a traveling vehicle. In particular, at closer distances, there is a high possibility due to the accuracy of measurement of the laser radar 2 that guardrails are seemingly observed and recognized likely as a subject moving at a lateral velocity of 0.6 m/sec or thereabout which is a lower limit velocity for recognition of a pedestrian. Accordingly, guardrails are one of disturbances for the subject recognition of pedestrians and are hardly distinguishable from pedestrians by ordinary manners using lateral velocity, and, as a result, it is necessary to distinguish between guardrails and pedestrians by means of parameters other than lateral velocity. In the subject recognizing system of the invention employs longitudinal distance variation of a subject as a parameter for recognition of guardrails based on a structural characteristic that a guardrail as a stationary subject is long in a direction along the roadway but short in a direction transversely to the roadway.

Figure 13:
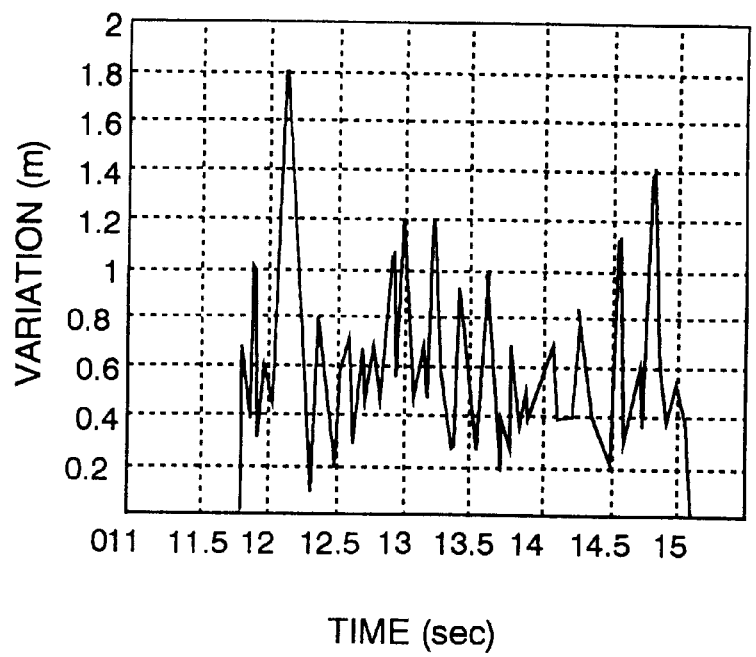
FIG. 13 is a graphical diagram showing a statistic variation of longitudinal distance of a pedestrian on foot.
Figure 14:
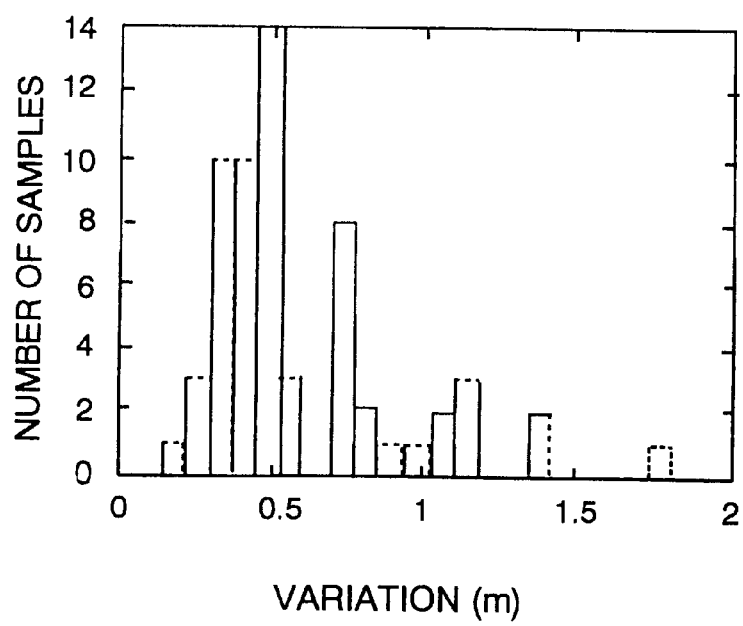
FIG. 14 is a graphical diagram showing a distribution of the variation of longitudinal distance of a pedestrian.
Figure 15:
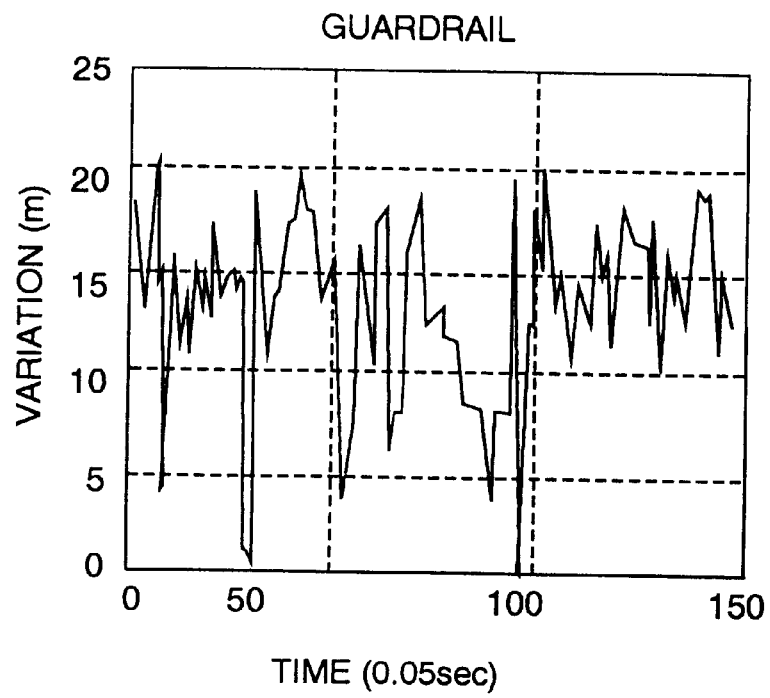
FIG. 15 is a graphical diagram showing a statistic variation of longitudinal distance of guardrails.
Figure 16:
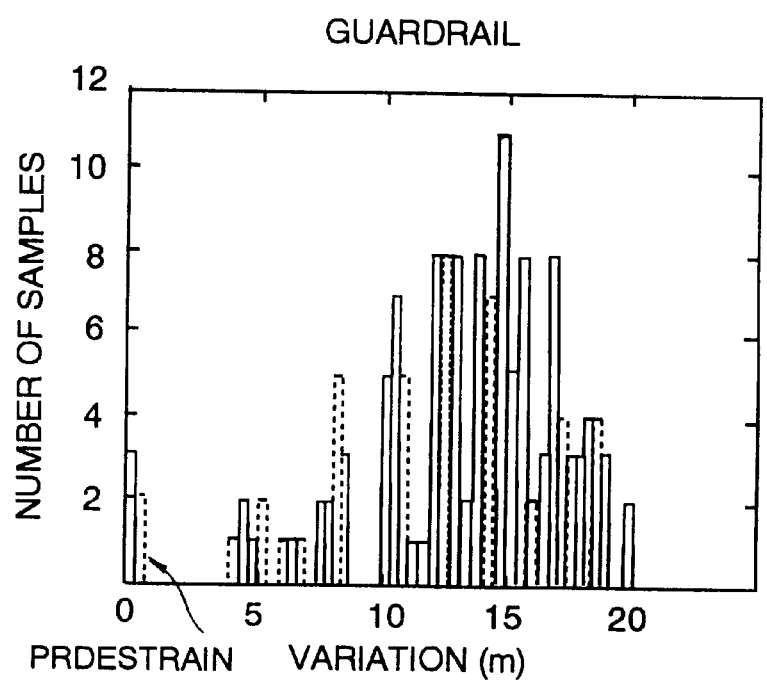
FIG. 16 is a graphical diagram showing a distribution of the variation of longitudinal distance of guardrails.
Figure 17:
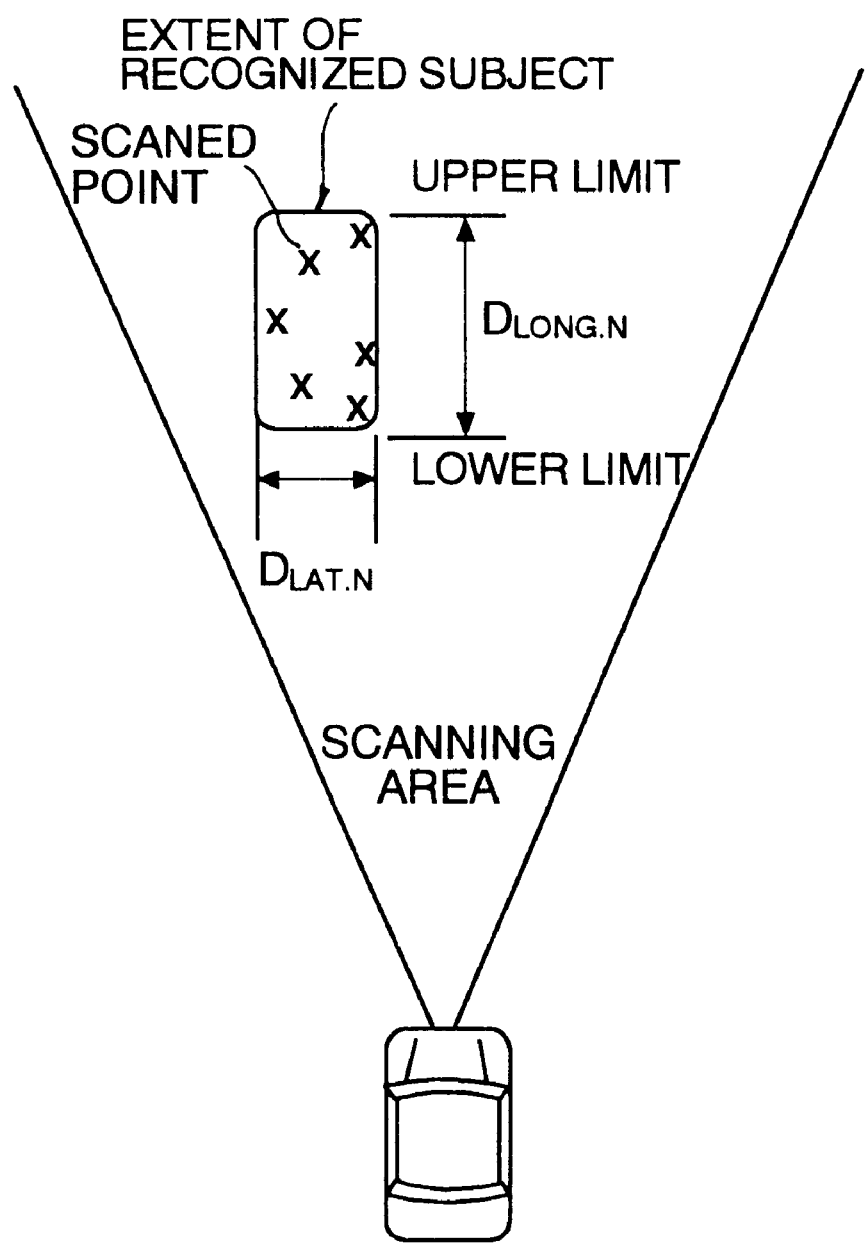
FIG. 17 is an illustration showing a concept of the variation of longitudinal distance.

Specifically, as shown in FIGS. 13 and 14 showing longitudinal distance variations of pedestrians with respect to time and the distribution of longitudinal distance variations, respectively, it is found that a pedestrian has a longitudinal distance variation of approximately 1 m. Similarly, longitudinal distance variations of guardrails with respect to time and the distribution of longitudinal distance variations are shown in FIGS. 15 and 16, respectively. In FIG. 16, the distribution of longitudinal distance variations less than 2 m of pedestrians is incorporated in comparison. From these figures, it is found that guardrails have longitudinal distance variations on the order of ten times greater magnitude than pedestrians and a threshold value for longitudinal distance variation of approximately 2 m makes it possible to distinguish between guardrails and pedestrians. The utilization of a threshold value for recognition of guardrails ensures that pedestrians are separated from disturbances including guardrails around the pedestrians in subject recognition.

In the determination made at step S311, when the longitudinal distance variation $D_{LONG.N}$ is larger than the threshold value a for guardrail judgement, and the lateral distance variation $D_{LAT.N}$ is smaller than the threshold value b for judgement of a group of guardrails, the subject is determined to be a guardrail. In order to increase the accuracy of distinguishing between guardrails and pedestrians at closer distances at which errors in recognition are apt to occur, this determination may be applied to subjects in a predetermined area closer to the vehicle.

When the subject is a guardrail as a result of the determination made at step S311, after resetting down the judgement flag $FV_N$ and the lock-on flag $FL_N$ and resetting the lock-on counter to 0 (zero) at step S312, the flow chart logic executes another sequence routine from step S301. On the other hand, when the subject is not a guardrail, another determination is made at step S313 as to whether the subject is a group of pedestrians or a pedestrian with tottering steps. In order to cope with an event where some pedestrian in the group rushes out into the traveling path of the vehicle, it is more secure against such a group of pedestrians to increase the probability of executing the judgement of danger by employing a lower threshold value $SH(L_N)$. Similarly, since a pedestrian who is tottering has a probability of entering the traveling path of the vehicle higher than a pedestrian in steady steps, it is also secure against such a tottery pedestrians to increase the probability of executing the judgement of danger by employing a lower threshold value $SH(L_N)$. In this point of view, in order to distinguish between a group of pedestrians and a tottery pedestrian, the utilization is made of the threshold value a for guardrail judgement and the threshold value b for judgement of a group of guardrails. When a subject has a longitudinal distance variation $D_{LONG.N}$ for guardrail judgement and a lateral distance variation $D_{LAT.N}$ smaller than the threshold values a for guardrail judgement and the threshold value b for judgement of a group of guardrails, respectively, at step S313, the subject is determined as a group of pedestrians. If the subject is a group of pedestrians, the lateral velocity $V_{LAT.N}$ of the group is compared with a half of the threshold value $SH(L_N)$ S314. When it is less than the half, the judgement flag $FV_N$ is set up to indicate that some one of the group of pedestrians has a high probability of entering the traveling path of the vehicle at step S315. In the case that the number of pedestrians in the group can be recognizable, the threshold value b may be made small for a large group of guardrails than for a small group of pedestrians with an effect of providing increased security against a large group of pedestrian.

At step S315, in order to recognize a tottery pedestrian, the utilization is made of the average of velocity variations of, which is given by dividing a count $COUNTV_N$ of the velocity variation counter by the number of samples $Num.N$. When a subject has an average velocity variation larger than a threshold value c at step S316, the subject is determined as one who is tottery. Further, if the subject is tottery, the lateral velocity $V_{LAT.N}$ of the tottery pedestrian is compared with a half of the threshold value $SH(L_N)$ S317. When it is less than the half, the judgement flag $FV_N$ is set up to indicate that the tottery pedestrian has a high probability of entering the traveling path of the vehicle at step S318. The lateral velocity $V_{LAT.N}$ of a subject having a velocity variation extremely larger than the threshold value c may be compared with the threshold value $SH(L_N)$ reduced less than a half with an effect of increasing security against the subject, like a pedestrian considerably unsteady on his or her feet.

Figure 9:
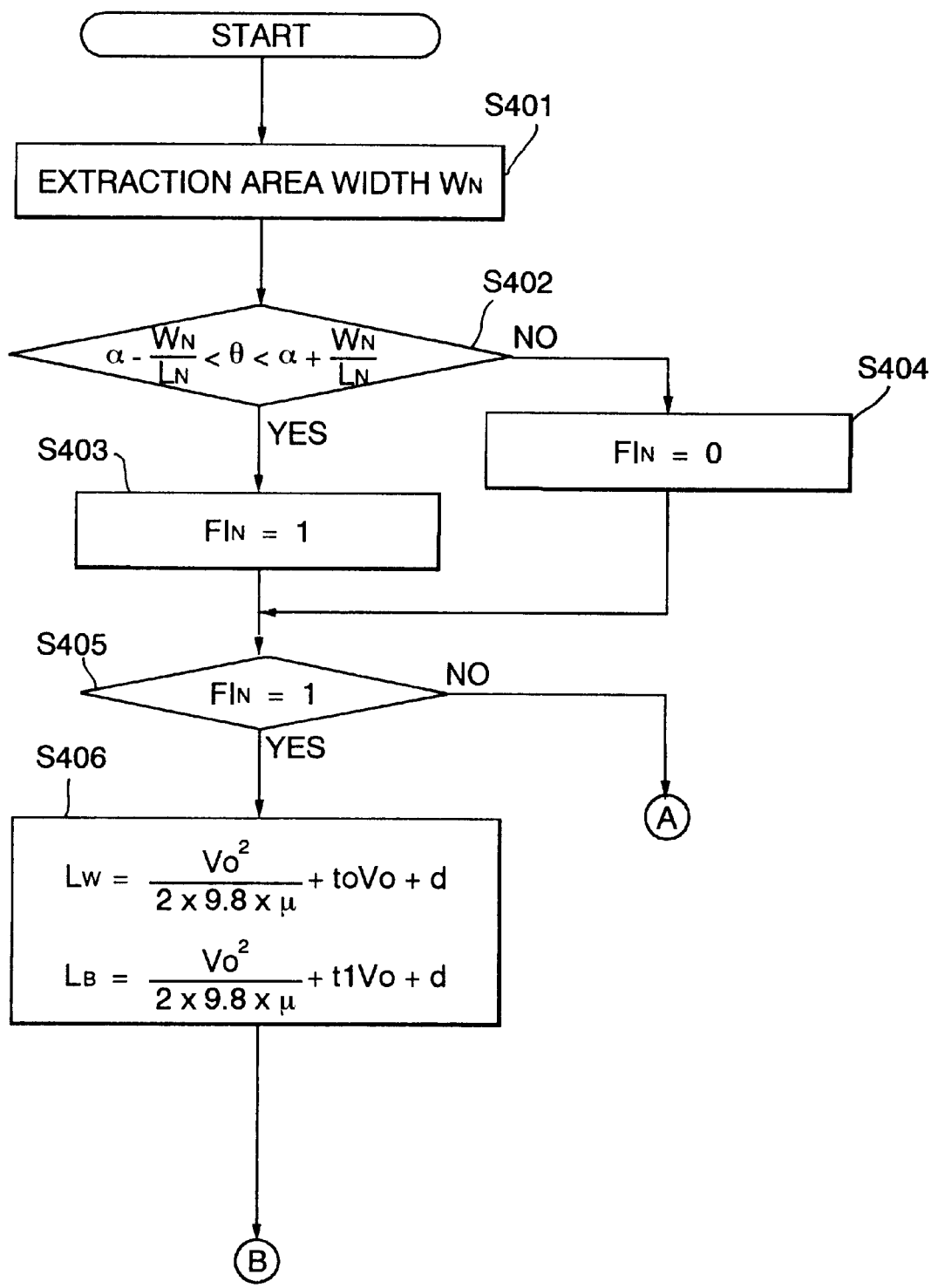
FIGS. 9 and 10 are flow charts illustrating the sequence routine of extracting a hazard moving subject.
Figure 10:
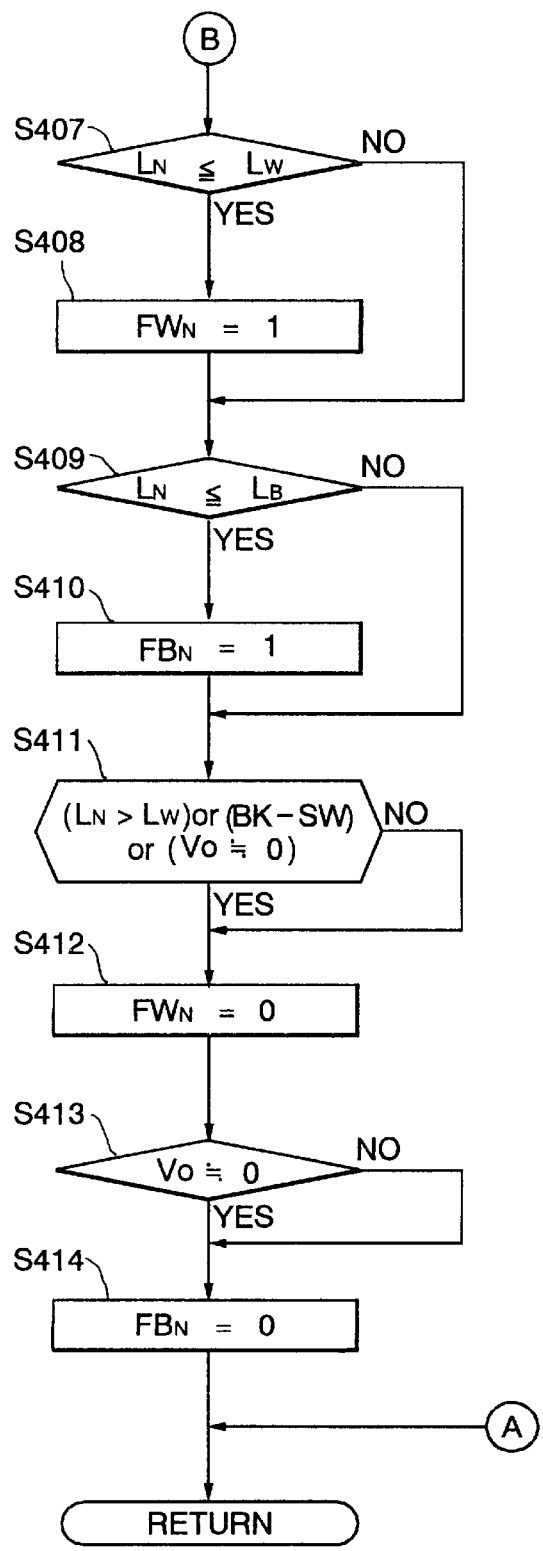

FIGS. 9 and 10 show a flow chart of the sequence routine of extracting a hazardous subject which is possibly hit by the vehicle executed at step S6 in the general sequence routine in FIG. 3. The sequence routine is executed to judge that a subject of a subject number N judged to have a high degree of possibility of entering the traveling path of the vehicle in the sequence routine of danger degree judgement at step S5 in the general sequence routine in FIG. 3 is further judged as to the probability of being hit by the vehicle and to send out a warning or apply brakes according to the probability of being hit by the vehicle.

Figure 18:
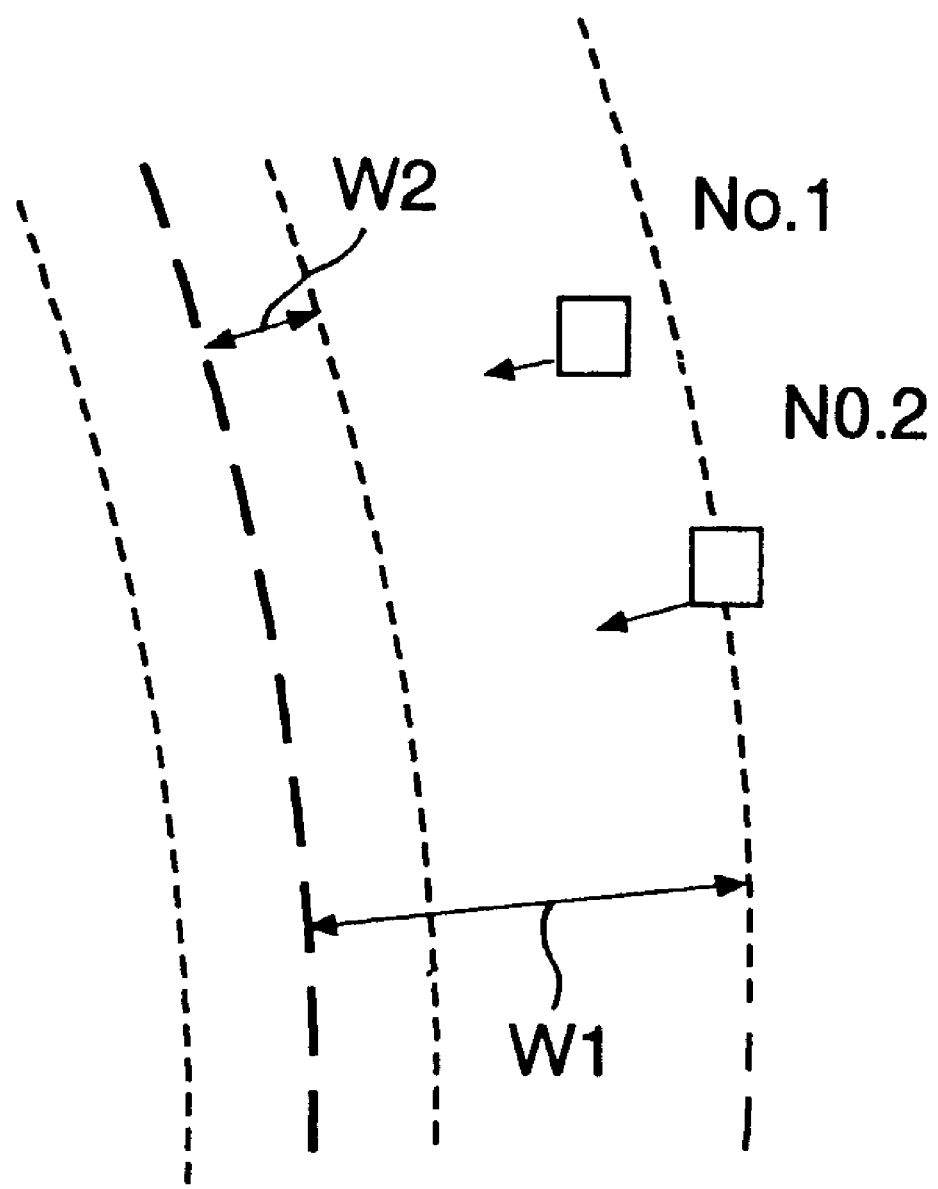
FIG. 18 is an illustration showing a concept of the extraction area width.

When the flow chart logic commences and control passes directly to a function block at step S401 where the width $W_N$ of a target area for the extraction of a hazardous subject for which the judgement flag $FV_N$ has been up is established. Basically, this extraction area width $W_N$ is preferably depending upon the lateral velocity $V_{LAT.N}$ of a subject moving transversely to the traveling path of the vehicle. It is judged that, when the moving subject is within the extraction area width $W_N$, it has a great possibility of being actually hit by the vehicle. For example, considering a subject No. 1 and a subject No.2 on the roadway as shown in FIG. 18, if the subject No. 1 has a lateral velocity $V_{LAT.1}$ sufficiently smaller than a lateral velocity $V_{LAT.2}$ of the subject No.2, the extraction area width $W_1$ for the subject No.1 is sufficiently narrower than the extraction area width $W_2$ for the subject No.2.

The extraction area width $W_N$ may be established in various manners as follows:

1. $W_N=(L_N/V_0) \times V_{LAT.N}+$(transverse width of the vehicle/2)

The extraction area width $W_N$ is established in light of that if the vehicle is not braked, it will hit the subject after a time of $(L_N/V_0)$ seconds.

2. The extraction of a hazardous subject is directed to subjects only on the roadway in which the vehicle traveling.

$W_N=d_R$ (transverse distance from a center of traveling path of the vehicle to the right edge of the roadway when a subject is on the right side of the vehicle); or $W_N=d_L$ (transverse distance from a center of traveling path of the vehicle to the right edge of the roadway when a subject is on the left side of the vehicle).

Figure 11:
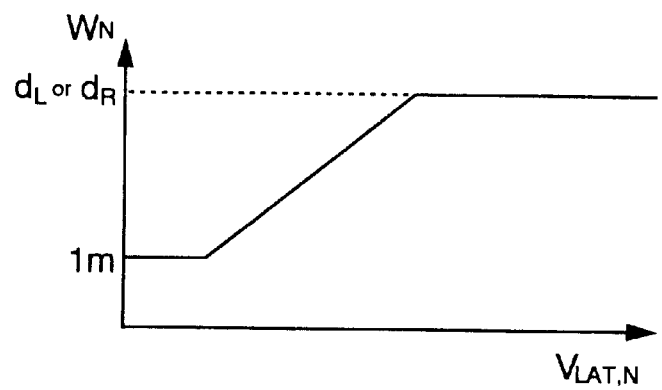
FIG. 11 is a graphical diagram showing an extraction area width.

3. The extraction area width $W_N$ is established according to a predetermined relationship to the lateral velocity $V_{LAT.N}$, for example, as shown in FIG. 11. That is, the extraction area width $W_N$ is small and constant for smaller lateral velocities $V_{LAT.N}$ and increased linearly with an increase in lateral velocity $V_{LAT.N}$. For higher lateral velocities $V_{LAT.N}$, the extraction area width $W_N$ is limited to a transverse distance from a center of traveling path of the vehicle to the right edge of the roadway when a subject is on the right side of the vehicle or a transverse distance from a center of traveling path of the vehicle to the right edge of the roadway when a subject is on the right side of the vehicle.

4. Either one of distances to sides of lanes on opposite sides of the vehicle which is distant from the traveling path more than the other may be employed as an extreme of the extraction area width $W_N$.

Figure 12:
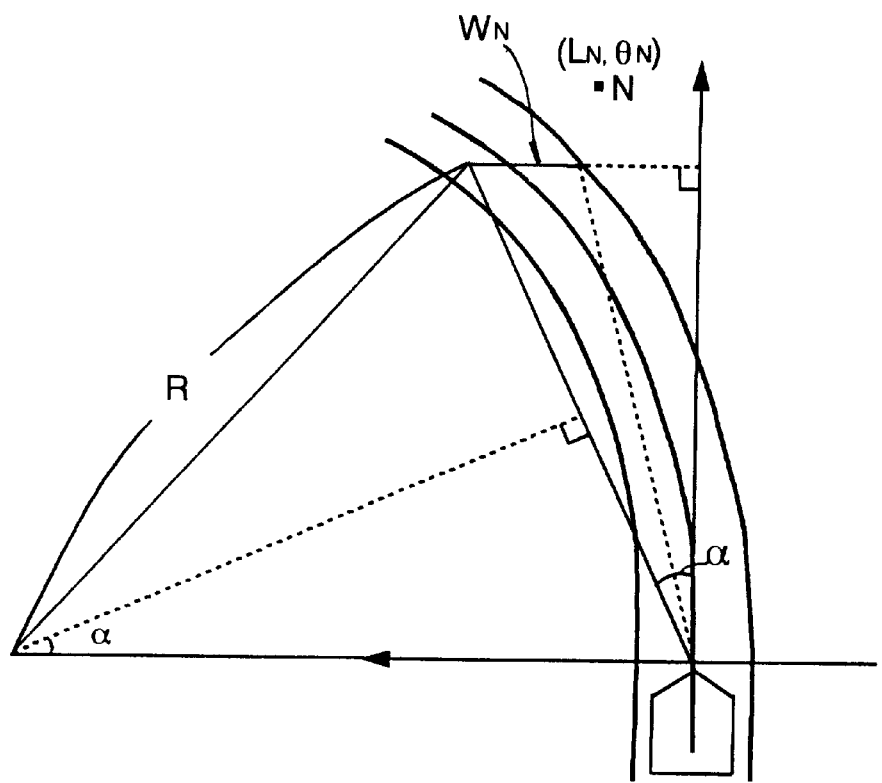
FIG. 12 is an illustration showing masking executed in the extraction of hazardous moving subject.

Subsequently, at step S402, a determination is made based on the extraction area width $W_N$ as to whether there is the danger of hitting the subject on the roadway even when the vehicle travels through a curvilinear path. As shown by way of example in FIG. 12, when a subject N is seen ahead at an inter-distance $L_N$ and an angle $\theta_N$ from the vehicle traveling on a curvilinear path having a radius of curvature R, the view angle $\alpha$ of the extraction area width $W_N$ with respect to a straight line on which the vehicle is presently directed is given as follows:

$$\alpha = L_N/2R$$

The following conditional relationship which must be satisfied by a subject within the extraction area width $W_N$ on each side of the vehicle can be shown:

$$\alpha - (W_N/L_N) < \theta_N < \alpha + (W_N/L_N)$$

where $\theta_N$ is the angle of a subject with respect to a straight line on which the vehicle is presently directed.

The conditional relationship is satisfied by a subject which is in the extraction area and possibly endangered by the vehicle.

When the conditional relationship is satisfied at step S402, a hazard flag $F_{IN}$ is set up to "1" at step S403. On the other hand, if the conditional relationship is not satisfied by a subject, this indicates that the subject is out of the extraction area, then, the hazard flag $F_{IN}$ is reset down at step S404. When it is determined at step S405 that the hazard flag $F_{IN}$ is down, the hazardous subject extraction is terminated. However, when it is determined at step S405 that the hazard flag $F_{IN}$ is up, this indicates that there is the danger of collision encountered by the subject and the vehicle, a warning is sent out, or otherwise the vehicle is automatically braked if the danger is imminent, at step S406.

For that purpose, calculations are made at step S406 to find a warning distance $L_W$ at which a warning is sent out and a braking distance $L_B$ at which the vehicle applies brakes automatically. These distances $L_W$ and $L_B$ are given by the following equations:

$$L_W = [V_o^2/(2 \times 9.8 \times \mu)] + t_o \times V_o + d$$

$$L_B = [V_o^2/(2 \times 9.8 \times \mu)] + t_1 \times V_o + d$$

where $t_o$ or $t_1$ is an expendable time before warning or braking, d is an expendable distance before warning or braking, and $\mu$ is the frictional coefficient of road surface.

When it is determined at step S407 that the inter-distance $L_N$ to the subject N is within the warning distance $L_W$, a warning flag $F_{WN}$ is set up to "1" at step S408, and it is further determined at step S409 that the inter-distance $L_N$ to the subject N is within the braking distance $L_B$, a braking flag $F_{BN}$ is set up to "1" at step S410. The warning flag $F_{WN}$ remains down when the inter-distance $L_N$ is greater than the warning distance $L_W$. Similarly, the braking flag $F_{BN}$ remains down when the inter-distance is greater than the braking distance $L_B$. Thereafter, a determination is made at step S411 as to whether any one of the following conditions is satisfied Condition A: the warning distance $L_W$ is exceeded by the inter-distance $L_N$ Condition B: the brake pedal is steed on to turn on a switch of an automatic braking system;

Condition C: the vehicle velocity $V_o$ is approximately 0 (zero)

When any one of the conditions A, B and C is satisfied at step S411, this indicates that the danger of collision has gone away, the warning flag $F_{WN}$ is reset down at step S412. Further, when the condition C is satisfied at step S413, this indicates that it is unnecessary to apply brakes, then, the braking flag $F_{WN}$ is reset down at step S414.

The final step orders return to the first step for another cycle of the routing of hazardous subject extraction.

Although, in the preceding embodiment, warning and braking are employed to avoid a collision, various variations, such as automatic steering, automatic engine throttle shutting off, automatic shifting down or the like, may be employed, individually or in combination.

It is to be understood that the present invention may be embodied with various changes, modifications and improvements, which may occur to those skilled in the art, without departing from the spirit and scope of the invention defined in the following claims.

What is claimed is:

1. A moving subject recognizing system for recognizing a subject moving toward a forward path of a vehicle equipped with the moving subject recognizing system to avoid a collision between the moving subject and the vehicle, said moving subject recognizing system comprising:

scanning means for scanning a predetermined forward field including a traveling path in which the vehicle travels to acquire data of moving subjects in said forward field based on scanning echoes; and recognizing means for detecting a transverse velocity of a moving subject moving in a direction transverse to said traveling path of the vehicle and determining a longitudinal distance of said moving subject in a direction of said traveling path based on said data, determining a variation of said longitudinal distance, said variation being defined as the difference between the longest and the shortest longitudinal distance of a specific extent recognizable as a moving subject from the vehicle along the traveling path, comparing said transverse velocity and said variation of said longitudinal distance with a predetermined first and a second threshold value, respectively, and recognizing that there is a danger that said moving subject enters said traveling path when said transverse velocity is greater than said first threshold value and said variation of said longitudinal distance is smaller than said second threshold value.

2. A moving subject recognizing system as defined in claim 1, wherein said recognizing means executes a comparison between said variation of said longitudinal distance and said second threshold value restrictively for a moving subject in a specific area in a roadway on which the vehicle is traveling.

3. A moving subject recognizing system as defined in claim 1, wherein said recognizing means increases said first threshold value for a moving subject closer to the vehicle than for a moving subject distant from the vehicle.

4. A moving subject recognizing system as defined in claim 1, wherein, when a moving subject remains recognized as having a danger of entering said traveling path for more than a specified period of time, said recognizing means continues to recognize said moving subject as having a danger of entering said traveling path even after said transverse velocity of said moving subject becomes lower than said first threshold value.

5. A moving subject recognizing system as defined in claim 4, wherein said specified period of time is decreased with a decrease in vehicle velocity.

6. A moving subject recognizing system as defined in claim 1, wherein said transverse velocity is measured in a direction perpendicular to said traveling path.

7. A moving subject recognizing system as defined in claim 1, wherein said scanning means comprises a laser radar for transmitting a laser beam to scan a forward field of the vehicle and analyzing echoes to acquire said transverse velocity and said longitudinal distance.

8. A moving subject recognizing system as defined in claim 1, wherein said recognizing means determines a moving subject having a possible danger of being hit by the vehicle if continuing to move toward said traveling path based on said transverse velocity.

9. A moving subject recognizing system as defined in claim 8, wherein said recognizing means further detects an inter-distance between a moving subject and the vehicle and extracts a moving subject having a possible danger of being hit by the vehicle based further on a change in said inter-distance.

10. A moving subject recognizing system as defined in claim 9, wherein said recognizing means recognizes a moving subject within a transverse area, having an extreme width, said extreme width being defined by one of distances to sides of lanes on opposite sides of the vehicle which is more distant from said traveling path than the other.

11. A moving subject recognizing system as defined in claim 9, and further comprising warning means for sending out a warning to a driver of the vehicle, wherein said recognizing means actuates said warning means when detecting said inter-distance less than a predetermined distance.

12. A moving subject recognizing system as defined in claim 9, and further comprising drive control means for automatically controlling driving systems of the vehicle to avoid a collision against said moving subject, wherein said recognizing means actuate said drive control means when detecting said inter-distance less than a predetermined distance.

13. A moving subject recognizing system as defined in claim 12, wherein said drive control means controls a braking system of the vehicle.

14. A moving subject recognizing system as defined in claim 1, wherein when said recognizing means detects said transverse velocity and said longitudinal distance for a number of moving subjects, said recognizing means disregarding said data of a moving subject which is at the furthest inter-distance when said number of moving subjects is greater than a specified greatest number.

15. A moving subject recognizing system as defined in claim 14, wherein, when said recognizing means still retains said data of a moving subject after being recognized as having a possible danger of being hit by the vehicle while being at the furthest inter-distance when said number of moving subjects is greater than said specified greatest number.

16. A moving subject recognizing system as defined in claim 1, wherein said recognition means detects said variation of said longitudinal distance and a transverse distance variation of a moving subject, said transverse distance variation defined as a difference between the longest and the shortest transverse distances of a specific extent recognizable as a moving subject from the vehicle, and compares said longitudinal distance variation and said transverse distance variation with a third predetermined threshold value set for roadside stationary subjects and a fourth predetermined threshold value set for a group of pedestrians, respectively, to recognize a moving subject as a group of pedestrians when said longitudinal distance variation and said transverse distance variation are smaller than said third predetermined threshold value and said fourth predetermined threshold value, respectively.

17. A moving subject recognizing system as defined in claim 16, wherein said recognizing means changes said first threshold value smaller when recognizing a moving subject as a group of pedestrians.

18. A moving subject recognizing system as defined in claim 17, wherein said recognizing means changes said first threshold value smaller when said group includes a large number of pedestrians than when said group includes a small number of pedestrians.

19. A moving subject recognizing system as defined in claim 1, wherein said recognizing means recognizes a moving subject as a tottery pedestrian when detecting a variation of said transverse velocity of said moving subject greater than a fifth threshold value.

20. A moving subject recognizing system as defined in claim 19, wherein said recognizing means changes said first threshold value smaller when recognizing a moving subject as a tottery pedestrian.

21. A moving subject recognizing system as defined in claim 20, wherein said recognizing means further changes said first threshold value when detecting a variation of said transverse velocity of said moving subject greater than a predetermined variation.

* * * * *